United States Patent Office.

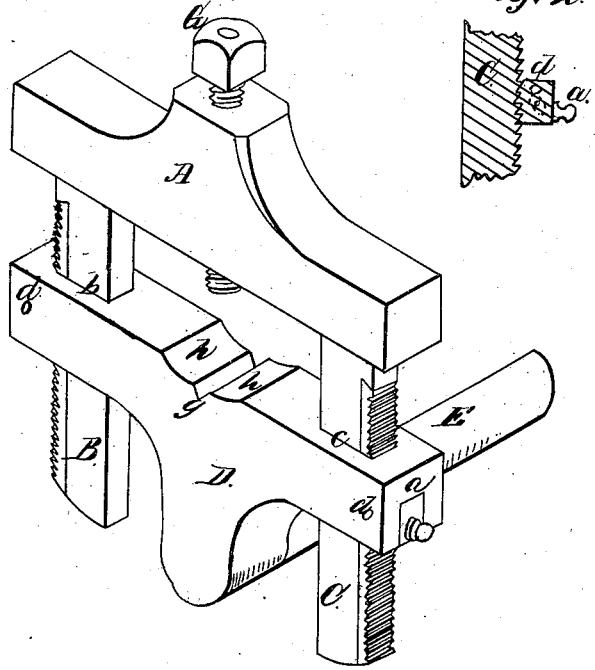

JOHN L. NETTLETON, OF NEW HAVEN, CONNECTICUT.

*Letters Patent No. 68,453, dated September 3, 1867.*

IMPROVED TOOL.

*The Schedule referred to in these Letters Patent and making part of the same.*

TO ALL WHOM IT MAY CONCERN:

Be it known that I, JOHN L. NETTLETON, of the city and county of New Haven, in the State of Connecticut, have invented a new and useful Improvement in Adjustable Dogs for Turning-Lathes, &c.; and I do hereby declare that the following is a full, clear, and exact description of the construction, character, and operation of the same, reference being had to the accompanying drawings, which make part of this specification, in which—

Figure 1 is a perspective view of the complete dog, showing its several parts, except the inside of the vibrating ratchets and their connections with the racks.

Figure 2 is a section of one of the racks and one of the vibrating ratchets in their proper connection.

My improvement consists in so constructing the dog with two parallel rack-bars, on which the adjustable part slides, that I can slide the adjustable part at once to the desired position, and so that, when desirable, I can attach and detach the dog, while the article to be turned is in its place in or on the common centres.

I make the permanent or stationary part of the dog of malleable cast iron, or any other suitable material, with a cross-head, as A, fig. 1, and two parallel bars, B and C, set at right angles to the cross-head, and on the outer edges of these bars B and C, I make racks with their teeth of the ratchet shape, pointing toward the cross-head, or so that when engaged with the teeth of the vibrating ratchet, as shown at $a$, fig. 2, the sliding part D cannot recede from the cross-head A. These racks may be of the same piece or part with the bars B and C, or they may be made of steel and attached by means of screws, dove-tailing, or otherwise; and should the iron teeth fail, by wear or breakage, the bars may be faced with steel or otherwise; and, if thought best, the teeth may be on the inner edges of the bars B and C. I make the sliding or adjustable part of malleable cast iron, or any other suitable material, substantially of the shape shown at D, fig. 1, with two mortises, as indicated at $b$ and $c$, fitted to receive and slide upon the parallel rack-bars B and C, as shown in fig. 1. In the two ends of this adjustable bar D, and connected with the mortises, I fit two vibrating ratchets, as indicated at $a$, fig. 1, the teeth of which work in those of the racks on the bars B and C, as shown in fig. 2. I secure these ratchets by joint or fulcrum-pins, as indicated at $d$ and $d$, so that they may be readily moved into and out of gear with the teeth of the rack by swinging on those pins, or a diagonal slot may be cut (as indicated by dots in fig. 2) to slide on the pin, or any other convenient means may be used for throwing them into and out of gear, as found most convenient. In the centre of the bar D, I cut a V-shaped groove, as shown at $g$, and, if thought best, I also mill out a segment of a circle, as shown at $h\ h$, which serves to hold the article being turned or dressed at right angles to the bar D and cross-head A, and on the central part of the bar D have a suitable projecting arm or bar, as shown at E, which is to be placed in the slot or guide of the revolving head or face plate of the lathe in the usual way. In the cross-head A, I fit a set-screw, as shown at G, by which to bind or pinch the article being turned after the sliding-bar D has been brought up to and secured in its proper position for use.

Having made the several parts, as before described, I place the dog on the article to be turned and bring the sliding-bar D up to it, (as the teeth of the ratchet $a$ will pass freely over the teeth in the racks B and C when moved in that direction,) and force or allow the teeth of the ratchets, as $a$, to fall into the teeth of the racks, as shown in fig. 2, when the bar D will be held firmly in its place. I then turn in the binding-screw G, when the article will be firmly secured in the dog; and when the projecting arm or rod E and the centres are in place all may be revolved together with the face plate of the lathe. To dog or undog an article while in the centres, I have only to draw back the ratchets, as $a$, and slip the slide D off of the bars B and C, when all will be open to be put on or taken off, and when the article is between the bars B and C the cross-bar D may be slipped on again to close it, as before.

What I claim as my invention, and desire to secure by Letters Patent, is—

The combination of the sliding-bar D and its movable ratchet-teeth $a$ with the parallel rack-bars B and C and cross-bar A, when all the parts are constructed, connected, and fitted for use, substantially as herein described and set forth.

JOHN L. NETTLETON.

Witnesses:
H. E. TALMAGE,
R. FITZGERALD.